(12) United States Patent
Lai

(10) Patent No.: US 6,932,632 B1
(45) Date of Patent: Aug. 23, 2005

(54) CARD CONNECTOR CAPABLE OF LOCKING/UNLOCKING CARD

(75) Inventor: Yaw-Huey Lai, Taipei (TW)

(73) Assignee: Tai-Sol Electronics Co., Ltd., Taipei (TW)

( * ) Notice: Subject to any disclaimer, the term of this patent is extended or adjusted under 35 U.S.C. 154(b) by 0 days.

(21) Appl. No.: 11/046,839

(22) Filed: Feb. 1, 2005

(30) Foreign Application Priority Data

Nov. 26, 2004 (TW) .............................. 93219125 U

(51) Int. Cl.[7] .......................................... H01R 13/62
(52) U.S. Cl. ..................................... 439/157; 439/327
(58) Field of Search ....................... 439/237, 152–160, 439/327–328

(56) References Cited

U.S. PATENT DOCUMENTS

| | | | | |
|---|---|---|---|---|
| 6,712,633 B2 * | 3/2004 | Tsai | ............................ | 439/341 |
| 6,817,874 B2 * | 11/2004 | Okabe | ........................... | 439/157 |
| 6,817,875 B2 * | 11/2004 | Chang et al. | ................. | 439/159 |
| 6,843,670 B2 * | 1/2005 | Yamaguchi et al. | ......... | 439/159 |
| 2002/0146923 A1 * | 10/2002 | Yu | ................................ | 439/157 |
| 2004/0005799 A1 * | 1/2004 | Okabe | ........................... | 439/157 |

* cited by examiner

Primary Examiner—J. F. Duverne
(74) Attorney, Agent, or Firm—Bacon & Thomas PLLC

(57) ABSTRACT

A card connector capable of locking/unlocking an electronic card is comprised of a shell and at least one locking member. The shell includes a receiving space inside, at least one slidable member mounted in the receiving space, and a spring mounted between the slidable guide member and the shell. The locking member includes an elastic piece mounted on said shell and a hook-like piece mounted to a distal end of the elastic piece. Accordingly, while the card is inserted into the card connector, the card can be locked by the locking member by that the hook-like piece securely hooks an external side of the card or unlocked by that the hook-like piece is pushed aside to enable the spring to push the slidable guide member to further push the card outwards for extraction.

9 Claims, 6 Drawing Sheets

CARD CONNECTOR CAPABLE OF LOCKING/UNLOCKING CARD

BACKGROUND OF THE INVENTION

1. Field of the Invention

The present invention relates generally to electronic devices, and more particularly to a card connector capable of locking/unlocking an electronic card.

2. Description of the Related Art

A conventional card connector compatible with memory cards or PCMCIA (Personal Computer Memory Card International Association) cards generally holds an inserted card therein by that the card is tight fitted with the shell of the card connector or the card is connected with the terminals of the card connector. To prevent the card from accidental disengagement from the card connector, a locking mechanism for locking the card is developed. As shown in FIG. 6, a locking mechanism 71 is mounted inside a card connector 70, employing its locking tongue 72 to jam a notch 771 formed at a lateral side of the card 77 and then locking the card 77.

However, since the notch 771 is not provided at the lateral side of each of the cards for locking by the locking tongue 72, the locking mechanism 71 fails to lock the card having none of such notch 771.

SUMMARY OF THE INVENTION

The primary objective of the present invention is to provide an improved card connector, which can lock any inserted card even if the card is not provided with a notch at its lateral side.

The foregoing objective of the present invention is attained by the improved card connector, which is comprised of a shell and at least one locking member. The shell includes a receiving space inside, an opening defined at a front end thereof in communication with said receiving space, at least one slidable member mounted in the receiving space for interaction with a card, a spring mounted between the slidable guide member and the shell, and a plurality of terminals mounted in the receiving space. The locking member includes an elastic piece and a hook-like piece. The elastic piece is mounted on said shell, having a part suspended. The hook-like piece is mounted to a distal end of the elastic piece and outside the opening. Accordingly, while the card is inserted into the card connector, the card can be locked by the locking member by that the hook-like piece securely hooks an external side of the card or unlocked by that the hook-like piece is pushed aside to enable the spring to push the slidable guide member to further push the card outwards for extraction.

DETAILED DESCRIPTION OF PREFERRED EMBODIMENTS

Figure 1:
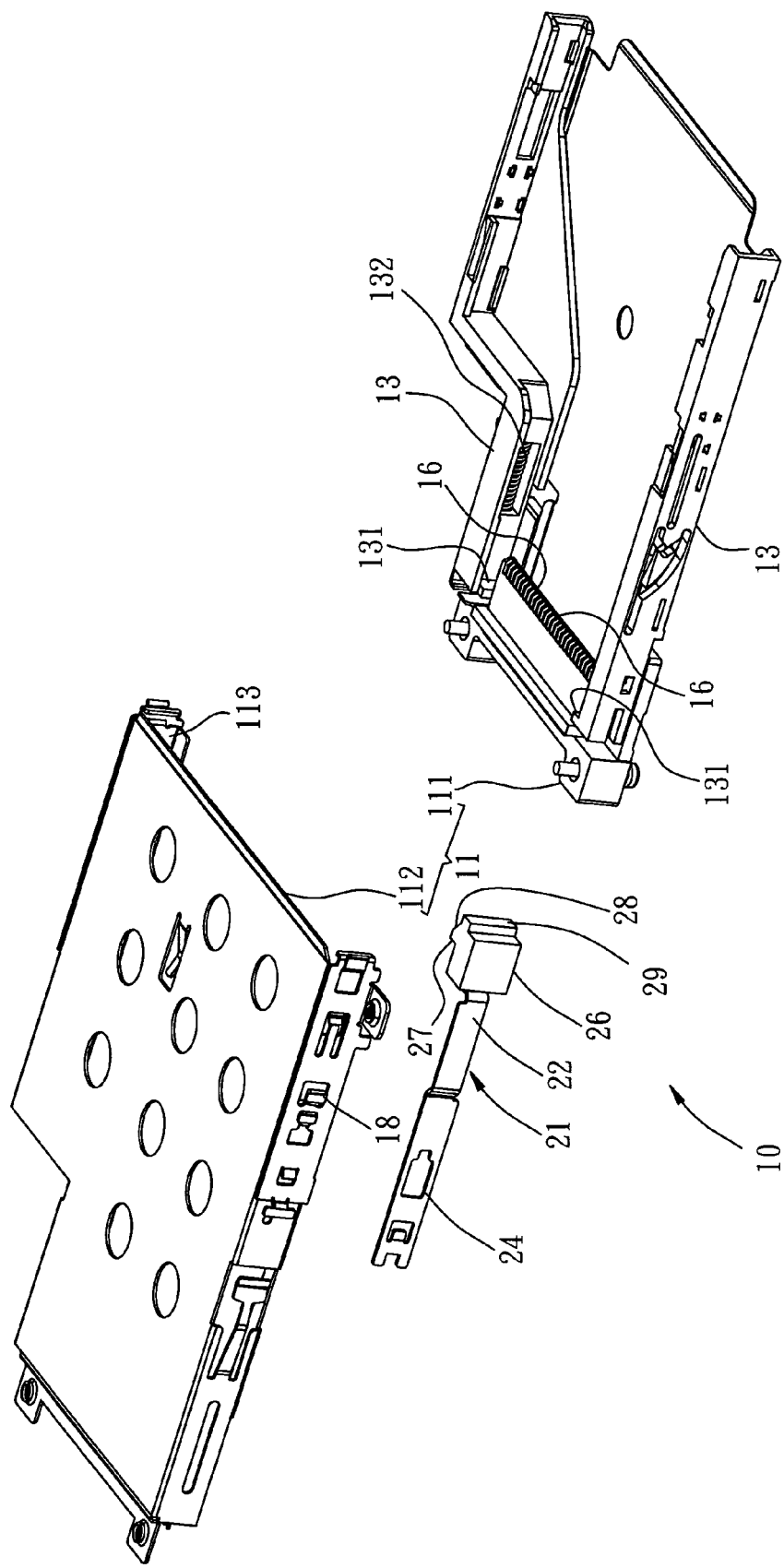
FIG. 1 is an exploded view of a preferred embodiment of the present invention.
Figure 2:
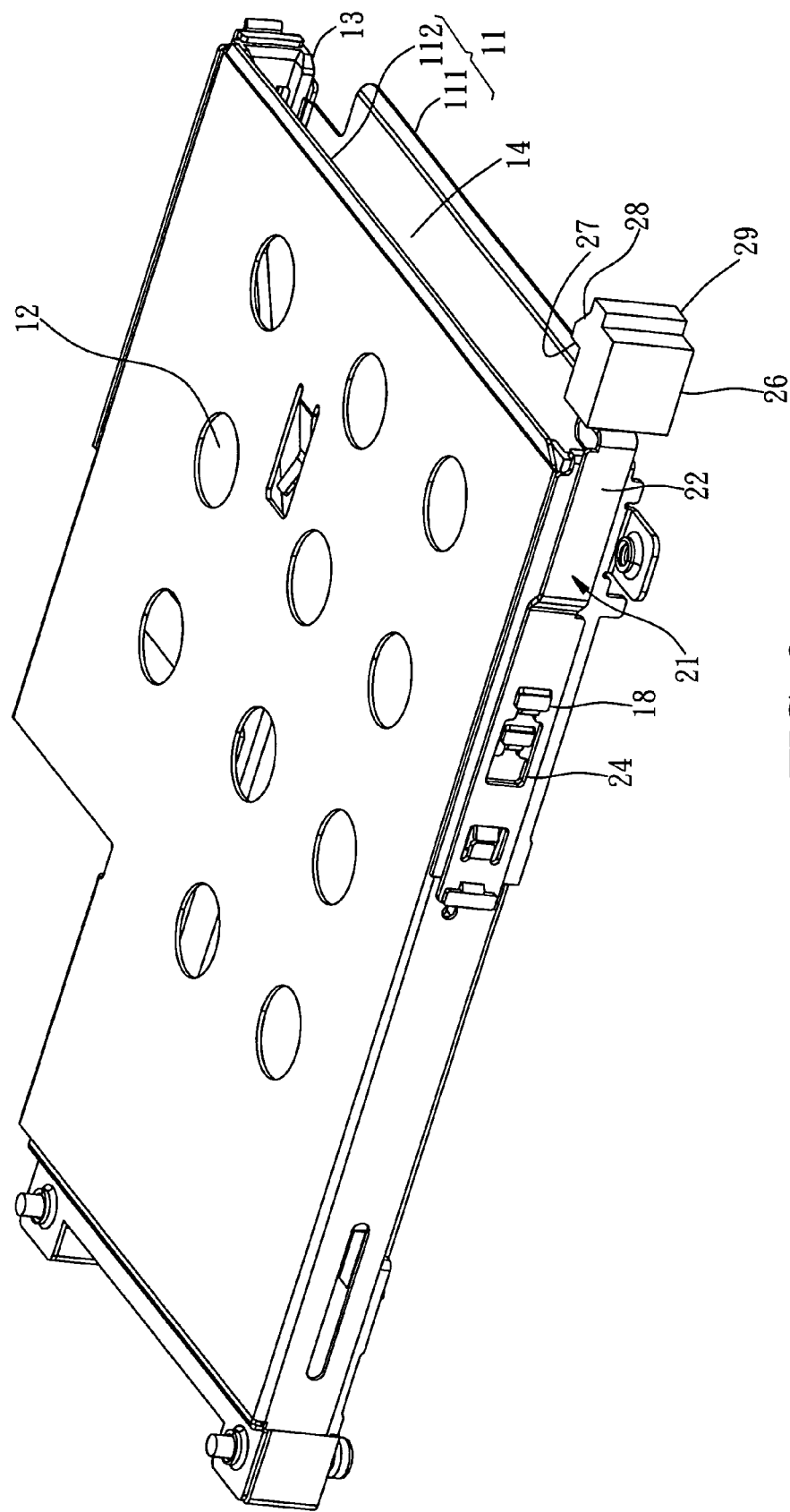
FIG. 2 is a perspective view of the preferred embodiment of the present invention.
Figure 3:
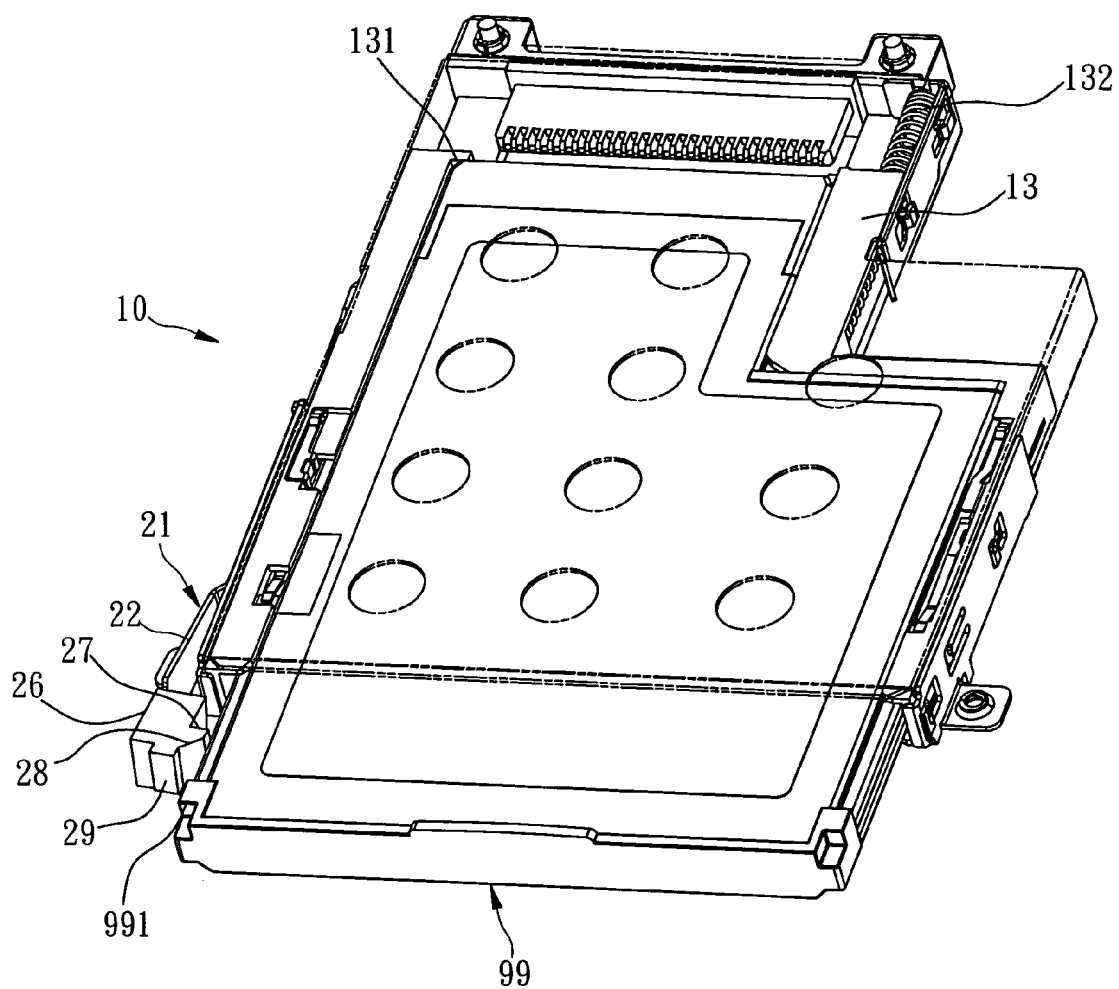
FIG. 3 is a schematic view of the preferred embodiment of the present invention, showing that a card is not locked by the locking member.

Referring to FIGS. 1–3, a card connector 10 constructed according to a preferred embodiment of the present invention is comprised of a shell 11 and at least one locking member 21.

The shell 11 includes a base 111, a cover 112, a receiving space 12 formed between the base 111 and the cover 112, an opening 14 defined at a front end thereof in communication with the receiving space 12, two slidable guide members 13 mounted at bilateral sides of the receiving space 12, a plurality of terminals 16, and a plurality of fixing portions 18. Each of the slidable guide members 13 has a spring 132 and a retaining portion 131 for contacting against an inserted card 99. The spring 132, which is embodied as a compression spring, is located at a rear end of the receiving space 12, and abutting a center of the receiving space 12. The spring 132 has two ends contacting respectively against the base 111 and one of the slidable guide members 13, for generating resilience that keeps forward movement of the guide member 13. The terminals 16 are located in the receiving space 12. The fixing portions 18 are located at an external side of the shell 11. The card 99 is inserted through the opening 14 into the receiving space 12 for electrical contact with the terminals 16.

The locking member 21 includes an elastic piece 22 and a hook-like piece 26. The elastic piece 22 is embodied as an elongated metallic sheet, having at least one slot 24 for connection with the fixing portions 18 to be fixed on the shell 11 and having a part suspended. The hook-like piece 26 is connected with a distal end of the suspended part of the elastic piece 22, slightly intercepting a path that the card 99 is inserted into the shell 11 and having a blocking portion 27 for holding an action portion 991 of the card 99, which is a notched corner of the card 99, a bevel 28 for contacting against the card 99 to enable the card 99 to jostle through the hook-like piece 26 while the card 99 is inserted, and a tab 29 for poking by the user's finger to push the hook-like piece 26 aside.

Figure 4:
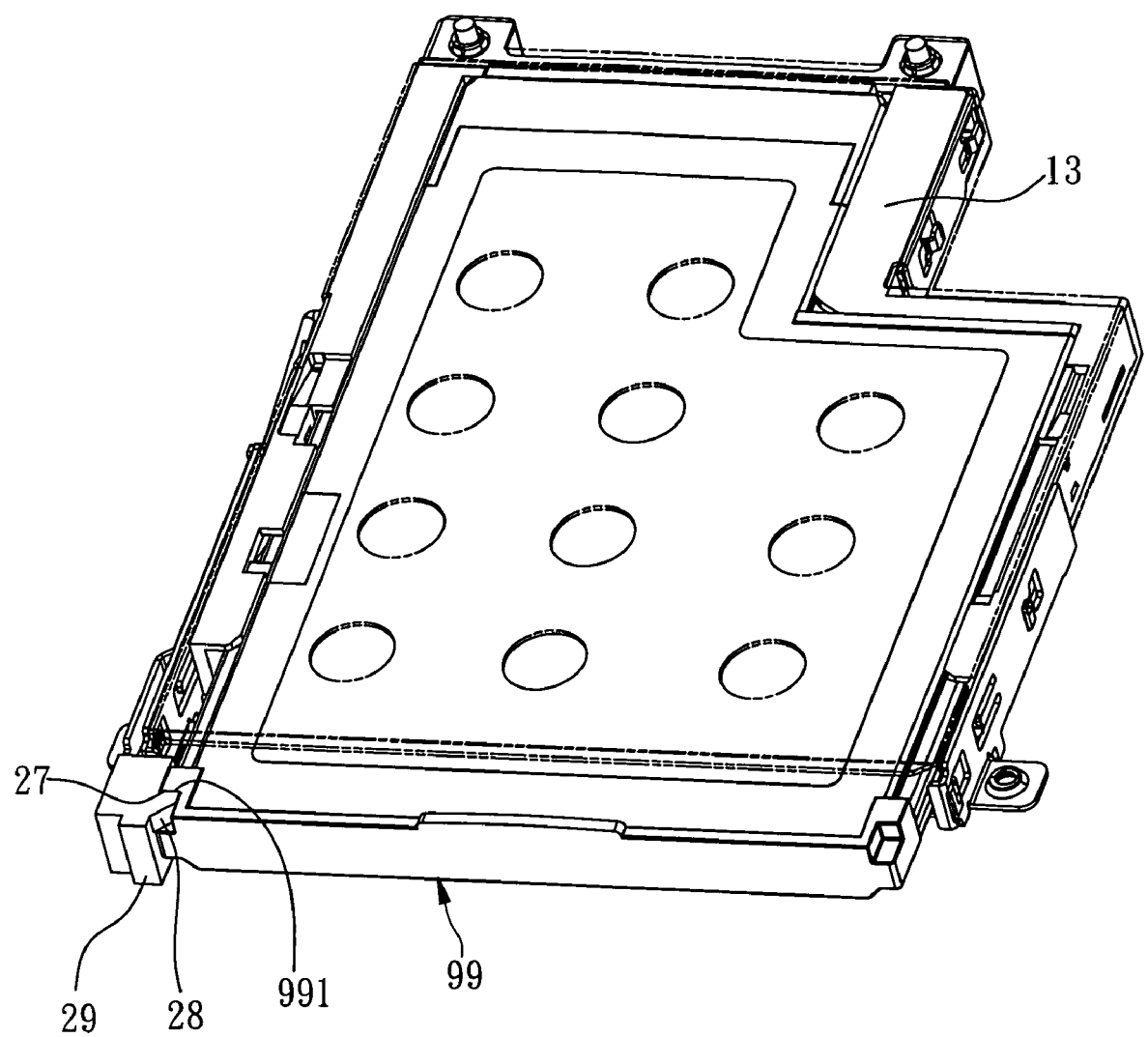
FIG. 4 is similar to FIG. 3, but showing that the card is locked by the locking member.

Referring to FIG. 3 again, before inserted into the card connector 10, the card 99 contacts against the bevel 28 and then jostles through the hook-like piece 26. While inserted, the card 99 contacts against the retaining portion 131 and then pushes the slidable guide members 13 backwards to compress the spring 132. After the card 99 is fully inserted, as shown in FIG. 4, the hook-like piece 26 lets the fixing portion 27 hook the action portion 991 of the card 99 to securely fix the card 99 and prevent the card 99 from accidental disengagement. While intending to extract the card 99 from the card connector 10, the user can let the finger poke the tab 29 to push the hook-like piece 26 aside and to disengage the fixing portion 27 from the action portion 991 of the card 99; meanwhile, the slidable guide members 13 are moved outwards by the resilience of the spring 132 to push the card 99 outwards, returning to the status shown in FIG. 3, such that the card 99 can be easily extracted by hand.

Figure 5:
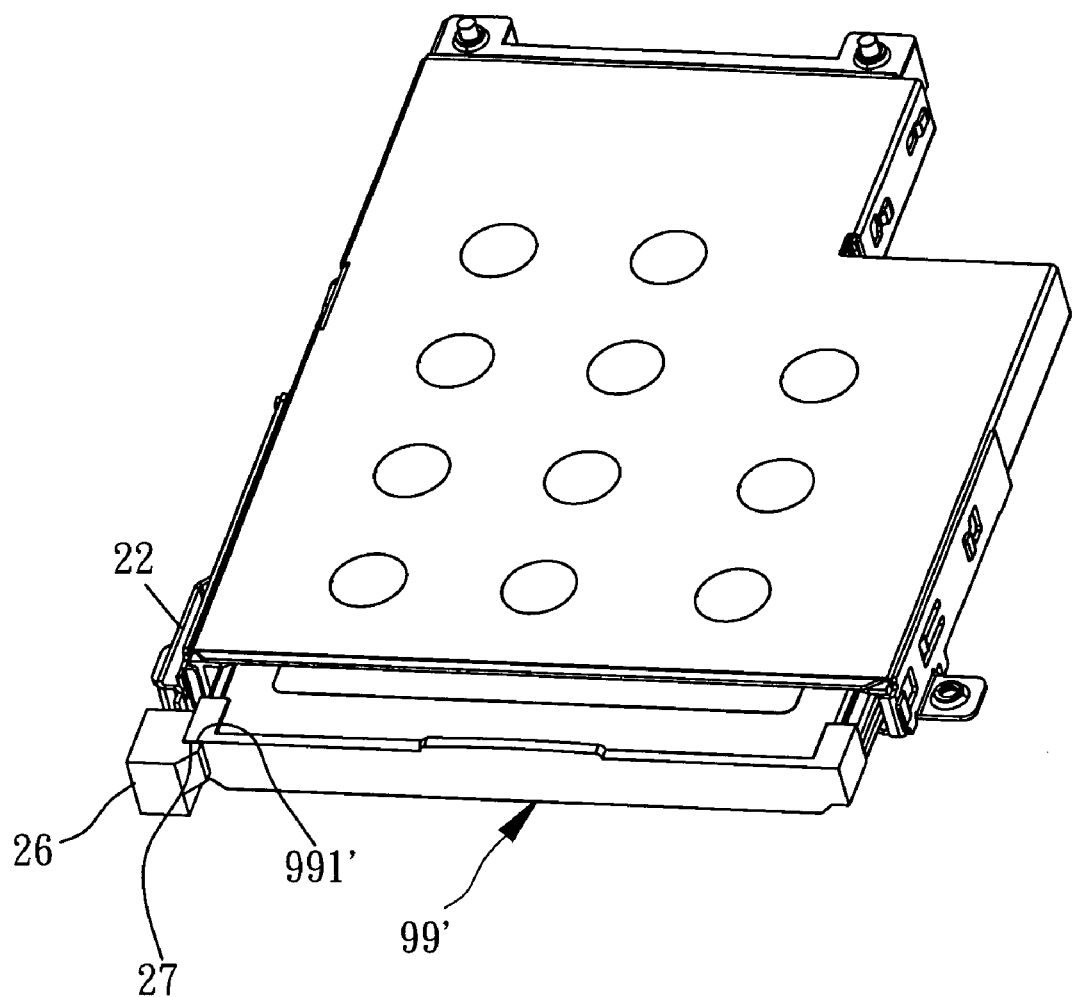
FIG. 5 is similar to FIG. 4, but showing that a different card is locked by the locking member.
Figure 6:
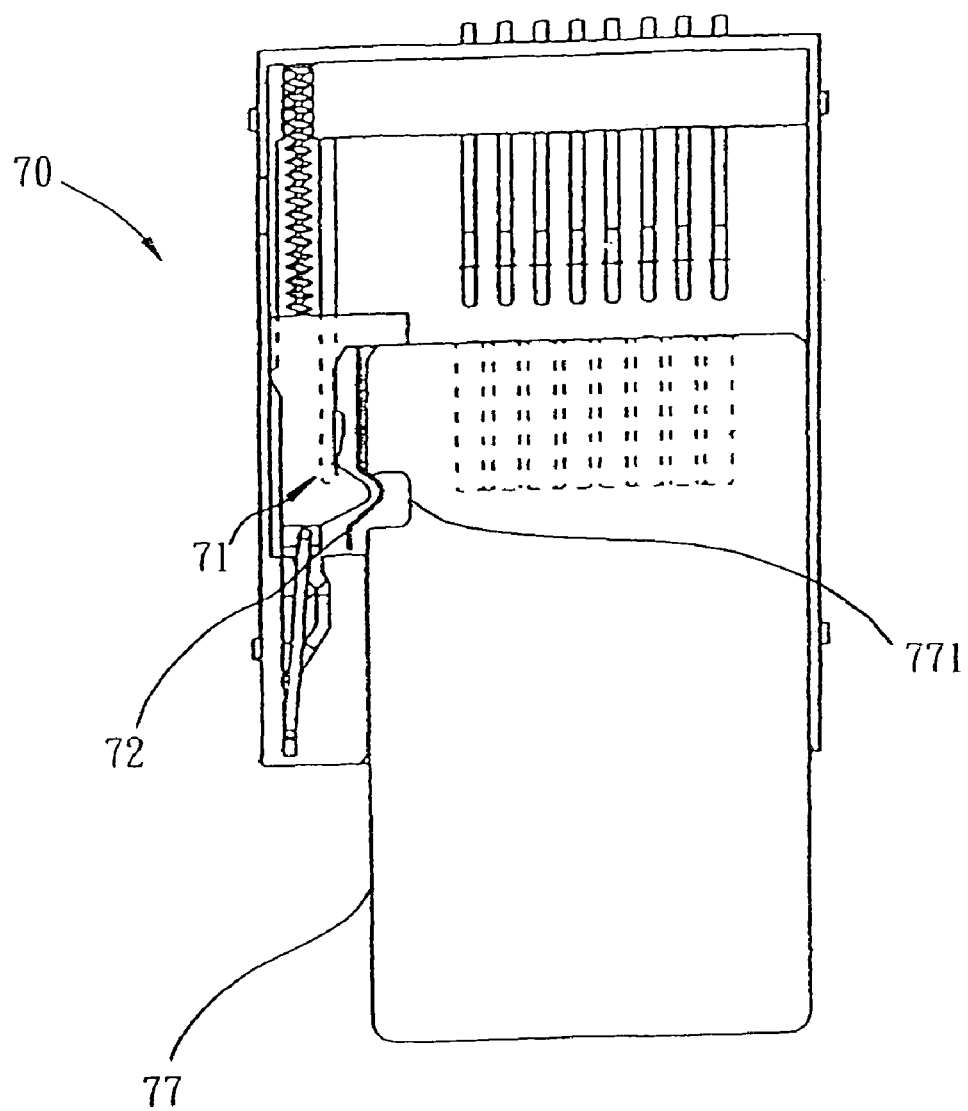
FIG. 6 is a schematic view of the conventional card connector.

In addition to the card 99, the card connector 10 is compatible with other card 99', which corner is not notched but is still the action portion 991 of the card 99' at an external side thereof, as shown in FIG. 5.

It is to be noted that the hook-like piece 26 can be alternatively formed with the elastic piece 22 in one piece.

In conclusion, the present invention includes the following advantages. Since the present invention is provided with the locking member for securely holding the external side of the card, the card will not fail to be securely fixed even if none of any notch is formed on the card. In addition, the present invention is compatible with different cards.

What is claimed is:

1. A card connector capable of locking/unlocking an electronic card, comprising:

a shell having a receiving space inside, an opening defined at a front end thereof in communication with said receiving space, a slidable guide member mounted in said receiving space and having a retaining portion for contacting against the card while the card is inserted, a spring mounted between said slidable guide member and said shell for generating resilience that keeps forward movement of said slidable guide member, and a plurality of terminals mounted in said receiving space; and a locking member having an elastic piece and a hook-like piece, said elastic piece being mounted to said shell and having a part suspended, said hook-like piece being mounted to a distal end of the suspended part of said elastic piece and outside said opening of said shell.

2. The card connector as defined in claim 1, wherein said shell comprises a base and a cover.

3. The card connector as defined in claim 1, wherein said elastic piece is an elongated sheet and comprises at least one slot, said shell having a plurality of fixing portions formed at its external side, said slot being connected with said fixing portions to enable said elastic piece to be fixedly mounted to said shell.

4. The card connector as defined in claim 1, wherein said hook-like portion slightly intercepts a path that the card is inserted into said shell.

5. The card connector as defined in claim 1, wherein said hook-like piece comprises a blocking portion for holding an action portion of the card.

6. The card connector as defined in claim 1, wherein said blocking portion comprises a bevel for contacting against the card to enable the card to jostle through said hook-like piece.

7. The card connector as defined in claim 1, wherein said hook-like piece comprises a tab for poking by the user's finger.

8. The card connector as defined in claim 1 further comprising a slidable guide member, said two slidable guide members being mounted respectively at bilateral side of said receiving space.

9. The card connector as defined in claim 1, wherein said spring is an compression spring located at a rear end of said receiving space and abutting its center.

\* \* \* \* \*